(12) United States Patent
Ohashi (10) Patent No.: US 10,304,181 B2
(45) Date of Patent: May 28, 2019

(54) METHOD, APPARATUS FOR ATTITUDE ESTIMATING, AND NON-TRANSITORY COMPUTER-READABLE STORAGE MEDIUM

(71) Applicant: FUJITSU LIMITED, Kawasaki-shi, Kanagawa (JP)

(72) Inventor: Takato Ohashi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 15/786,831

(22) Filed: Oct. 18, 2017

(65) Prior Publication Data
US 2018/0150950 A1 May 31, 2018

(30) Foreign Application Priority Data
Nov. 30, 2016 (JP) ................................ 2016-233425

(51) Int. Cl.
| | | |
|---|---|---|
| G06K 9/00 | (2006.01) | |
| G06T 7/00 | (2017.01) | |
| G06T 1/00 | (2006.01) | |
| G06T 7/11 | (2017.01) | |
| G06T 7/149 | (2017.01) | |
| G06K 9/62 | (2006.01) | |
| G06T 7/73 | (2017.01) | |

(52) U.S. Cl.
CPC .......... *G06T 7/001* (2013.01); *G06K 9/00355* (2013.01); *G06K 9/00389* (2013.01); *G06K 9/6267* (2013.01); *G06T 1/0007* (2013.01); *G06T 7/11* (2017.01); *G06T 7/149* (2017.01); *G06T 7/73* (2017.01); *G06T 2207/10016* (2013.01); *G06T 2207/10024* (2013.01)

(58) Field of Classification Search
CPC ... G06T 7/001; G06T 7/11; G06T 7/73; G06T 7/149; G06T 2207/10016;
(Continued)

(56) References Cited

U.S. PATENT DOCUMENTS

| | | | | |
|---|---|---|---|---|
| 8,213,680 | B2 * | 7/2012 | Fitzgibbon | ......... G06K 9/00335 348/169 |
| 9,552,070 | B2 * | 1/2017 | Shotton | ................... G06F 3/017 |

(Continued)

FOREIGN PATENT DOCUMENTS

| | | |
|---|---|---|
| JP | 2008-112211 | 5/2008 |
| WO | 2005/043466 | 5/2005 |
| WO | 2009/091029 | 7/2009 |

OTHER PUBLICATIONS

James Kennedy et al., "Particle Swarm Optimization", IEEE, 0-7803-2768-3/95, pp. 1942-1948 (7 pages), 1995.

*Primary Examiner* — Ali Bayat
(74) *Attorney, Agent, or Firm* — Fujitsu Patent Center (57) ABSTRACT

A method performed by a computer for attitude estimation includes: executing a first process that includes obtaining a first image; executing a second process that includes calculating a degree of noncoincidence between the obtained first image and a second image obtained before the first image; executing a third process that includes setting, from the degree of noncoincidence, and for each movable portion of a model as an attitude estimation target, a range where the movable portion is estimated to be movable in a frame of the first image; and executing a fourth process that includes outputting the range set for each movable portion as a generation range of a random number determining an amount of change of the each movable portion of the model to a generating process configured to generate a particle as a candidate for an attitude of the model in accordance with the generation range.

6 Claims, 8 Drawing Sheets

(58) Field of Classification Search
CPC . G06T 2207/10024; G06T 2207/30201; G06T 1/0007; G06K 9/00355; G06K 9/00389; G06K 9/6267
See application file for complete search history.

(56) References Cited

U.S. PATENT DOCUMENTS

| | | |
|---|---|---|
| 9,773,155 B2 * | 9/2017 | Shotton .............. G06K 9/00201 |
| 10,110,881 B2 * | 10/2018 | Shotton .............. G06K 9/00214 |
| 2007/0009135 A1 | 1/2007 | Ishiyama |
| 2008/0152218 A1 | 6/2008 | Okada |
| 2011/0052013 A1 | 3/2011 | Sasahara et al. |
| 2016/0086350 A1 * | 3/2016 | Michel ............... G06K 9/00362 |
| | | 382/103 |
| 2016/0307032 A1 * | 10/2016 | Butler ................ G06K 9/00208 |
| 2016/0335790 A1 * | 11/2016 | Fleishman ......... G06K 9/00355 |

* cited by examiner

METHOD, APPARATUS FOR ATTITUDE ESTIMATING, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-233425, filed on Nov. 30, 2016, the entire contents of which are incorporated herein by reference.

FIELD

The embodiments discussed herein are related to a method, an apparatus for attitude estimating, and a non-transitory computer-readable storage medium.

BACKGROUND

A technology referred to as particle swarm optimization (PSO), which is one of evolutionary algorithms, is used as an example of technologies for estimating the attitude of an object whose shape changes. For example, in a case where the attitude of a hand is estimated, a model is defined which has, for each joint as a movable portion of the hand, parameters such as the position of the joint and the movable angle of the joint. When such modeling is performed, estimation of a 26-dimensional parameter is performed to estimate the attitude of the hand.

Here, in PSO, a present attitude candidate is generated as a particle by adding an amount of change calculated using a random number to an attitude estimated at a previous time. For example, when the attitude of the hand is estimated, an occurrence range of the random number used to generate the particle is set within a maximum range in which the joint is movable. According to errors between a plurality of particles thus generated and observation data, each of the particles is updated repeatedly. A particle having a highest evaluation is output.

Examples of the related arts include Japanese Laid-open Patent Publication No. 2008-112211, International Publication Pamphlet No. WO 2005/043466, and International Publication Pamphlet No. WO 2009/091029.

SUMMARY

According to an aspect of the embodiments, a method performed by a computer for attitude estimation includes: executing, by a processor of the computer, a first process that includes obtaining a first image; executing, by the processor of the computer, a second process that includes calculating a degree of noncoincidence between the obtained first image and a second image obtained before the first image; executing, by the processor of the computer, a third process that includes setting a first range for each movable portion of a model as an attitude estimation target in accordance with the degree of noncoincidence, the first range being a range in which the movable portion is estimated to be movable in a frame from which the first image is obtained; and executing, by the processor of the computer, a fourth process that includes outputting the first range set for each movable portion as a generation range of a random number determining an amount of change of the each movable portion of the model to a generating process configured to generate a particle as a candidate for an attitude of the model in accordance with the generation range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In research and development in a technical field as described above, the inventors of the present technology have found a new problem that with related technology, it may be difficult to set appropriately an occurrence range of a random number for generating a particle.

For example, each joint is not necessarily moved to a limit of a maximum movable range of the joint each time observation data is obtained. When the occurrence range of the above-described random number is nevertheless fixed and set to be the maximum movable range of the joint, the particle is generated in an excessively larger range than that of an actual change in attitude. In this case, it is difficult for a result of update of the particle to converge to the actual attitude, and many iterations are needed before the result of update of the particle converges to the actual attitude. Further, there is an increased possibility of falling into a local solution during repetition of the update of the particle. Thus, an attitude far removed from the actual attitude may be estimated.

According to one aspect of the present disclosure, provided are technologies which may appropriately set the occurrence range of a random number for generating a particle.

An attitude estimating method, an attitude estimating program, and an attitude estimating device according to the present application will hereinafter be described with reference to the accompanying drawings. Incidentally, present embodiments do not limit the technology of the disclosure. In addition, the embodiments may be combined with each other as appropriate within a scope in which processing contents are not contradicted.

First Embodiment

Figure 1:
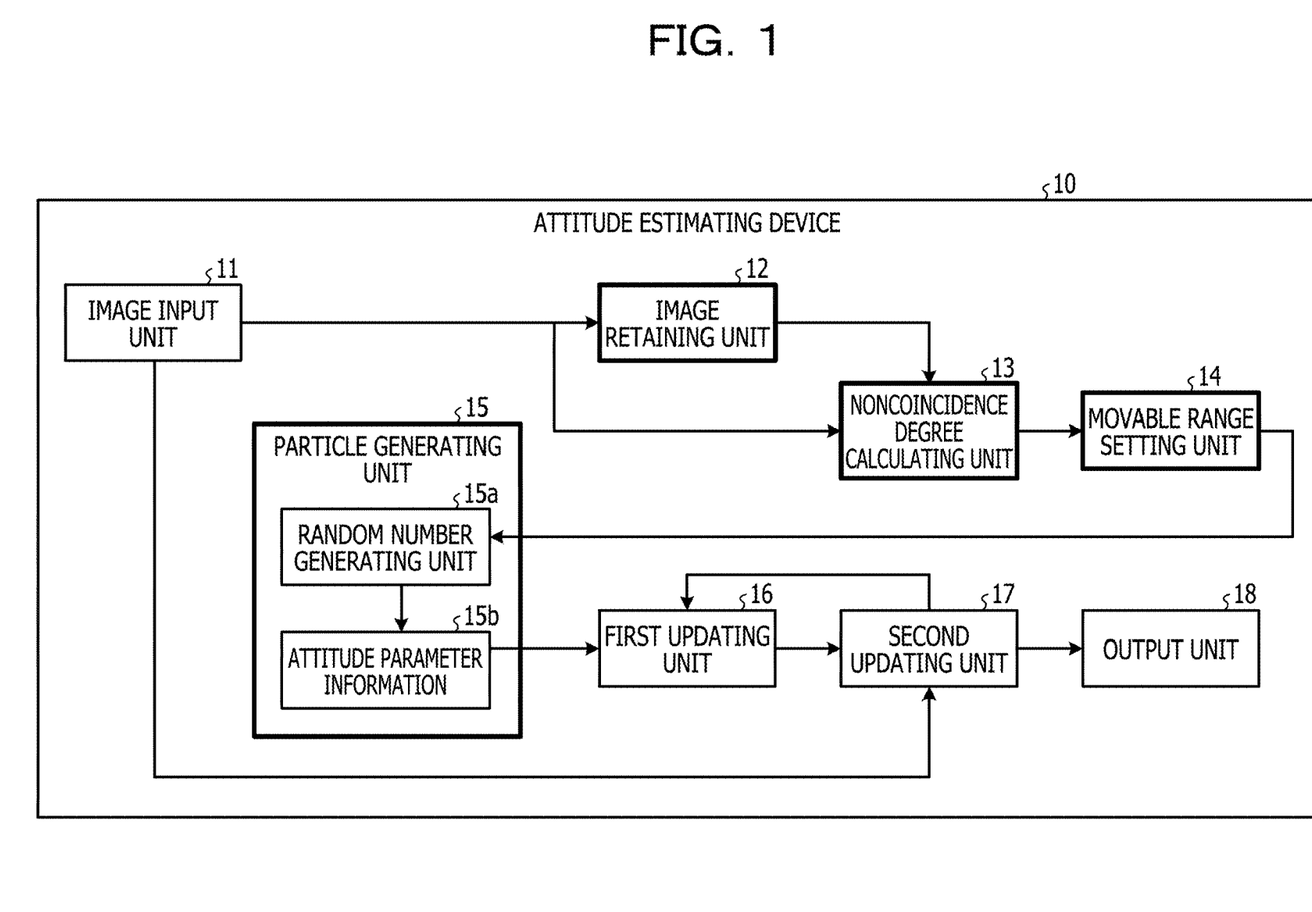
FIG. 1 is a block diagram illustrating a functional configuration of an attitude estimating device according to a first embodiment.

FIG. 1 is a block diagram illustrating a functional configuration of an attitude estimating device according to a first embodiment. The attitude estimating device 10 illustrated in FIG. 1 estimates the attitude of an object whose shape changes. As an example, PSO, which is one of evolutionary algorithms, is applied to the estimation of the attitude.

PSO (particle swarm optimization)

In this PSO, an attitude candidate, or a so-called attitude hypothesis, in an nth frame (n-th frame) is generated as a particle using random numbers from an attitude estimated in an (n−1)th frame. Then, the particle is updated according to the following Equation (1) and the following Equation (2).

$$v_i^{k+1} = wv_i^k + c_1 r_1 (x_{Pbest,i}^k - x_i^k) + c_2 r_2 (x_{Gbest}^k - x_i^k) \qquad (1)$$

$$X_i^{k+1} = X_i^k + V_i^{k+1} \qquad (2)$$

Equation (1) is an equation for calculating a change velocity v of the attitude of an ith particle in a (k+1)th update. This Equation (1) includes three terms. For example, the first term includes a fixed weight coefficient w and the change velocity v of the attitude of the ith particle in a kth update. Further, the second term includes a fixed ratio c1, a random number r1, an optimum attitude xPbest, i in one particle in the kth update, and the attitude x of the ith particle in the kth update. Here, selected as the attitude xPbest, i at the time of the kth update is the attitude of an ith particle having a maximum evaluation value obtained between the observation data of the nth frame and the ith particle among ith particles calculated up to the kth update. The second term functions such that the change velocity v in the (k+1)th update maintains an optimum state of the individual ith particle. Further, the third term includes a fixed ratio c2, a random number r2, an optimum attitude xGbest, i in all particles in the kth update, and the attitude x of the ith particle in the kth update. Here, selected as the attitude xGbest, i at the time of the kth update is the attitude of a particle having a maximum evaluation value obtained between the observation data of the nth frame and the particle among all of the particles calculated for the kth time. The third term functions such that the change velocity v in the (k+1)th update goes toward an optimum state of the whole of the ith particles. Incidentally, the particles may be controlled to converge readily by making settings such that the smaller the number of updates, the wider the occurrence range of the random number r1 and the random number r2 and such that the larger the number of updates, the narrower the occurrence range of the random number r1 and the random number r2.

Equation (2) is an equation for calculating the attitude x of the ith particle in the (k+1)th update. This Equation (2) includes two terms. For example, the first term includes the attitude x of the ith particle in the kth update. Further, the second term includes the change velocity v of the attitude of the ith particle in the (k+1)th update, the change velocity v being obtained by Equation (1).

The change velocity v and the attitude x are updated for each particle according to Equation (1) and Equation (2). The update of the change velocity v and the attitude x is thereafter repeated until the number of updates reaches a given upper limit number of times or the evaluation value of the attitude xGbest, i becomes equal to or more than a given threshold value.

Example of Model

Figure 2:
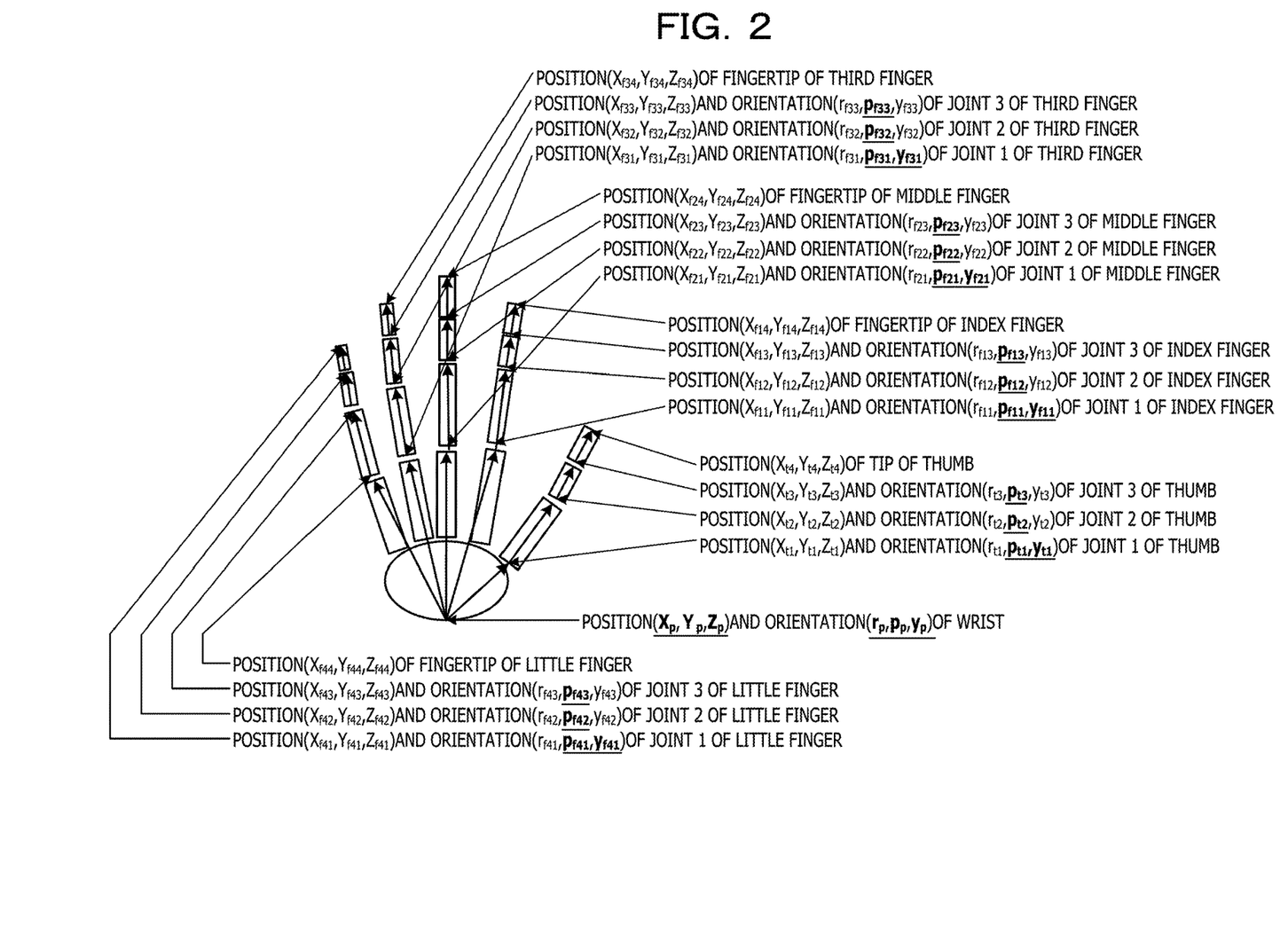
FIG. 2 is a diagram illustrating an example of a model.

FIG. 2 is a diagram illustrating an example of a model. FIG. 2 illustrates an example in which a hand is modeled into a wrist, joints from the wrist onward, and distal parts (fingertips). Further, FIG. 2 illustrates a case where parameters of the joint of the wrist are represented by a global coordinate system, while the other joints and the distal parts are represented by previous joint coordinate systems. Further, "X," "Y," and "Z" in parameters illustrated in FIG. 2 refer to three-dimensional orthogonal coordinates, and "r," "p," and "y" refer to an angle about an X-axis, an angle about a Y-axis, and an angle about a Z-axis. It is to be noted that while a model of a hand is illustrated as an example in FIG. 2, attitude estimation based on PSO may also be applied to models of other objects that change in shape.

As illustrated in FIG. 2, the model of the hand includes the wrist, joints 1 to 3 of a thumb and a tip of the thumb, joints 1 to 3 of an index finger and a fingertip of the index finger, joints 1 to 3 of a middle finger and a fingertip of the middle finger, joints 1 to 3 of a third finger and a fingertip of the third finger, and joints 1 to 3 of a little finger and a fingertip of the little finger. For the joints among these parts, the positions and orientations of the joints are defined as parameters, while positions are defined as parameters for the fingertips. Of these parameters, parameters represented in boldface in FIG. 2 are parameters changing according to movement of the hand, and the other parameters are fixed parameters determined according to individual characteristics, for example, physical features. Hence, estimating the attitude of the hand may be said to be equivalent to estimating 26 parameters represented in boldface (underlined) in FIG. 2.

When the attitude of the hand is thus estimated from the hand model illustrated in FIG. 2, a vector including the parameters represented in boldface (underlined) in FIG. 2 is defined as the attitude xi of a particle, and the attitude xi differentiated with respect to time is defined as a change velocity vi. For example, the attitude xi of the ith particle is expressed as in the following Equation (3), and the change velocity vi of the ith particle is expressed as in the following Equation (4).

$$x_i = (X_{pi}, Y_{pi}, Z_{pi}, r_{pi}, p_{pi}, y_{pi}, r_{t1i}, p_{t1i}, p_{t2i}, p_{t3i}, p_{f11i}, \qquad (3)$$
$$y_{f11i}, p_{f12i}, p_{f13i}, p_{f21i}, y_{f21}, p_{f22}, p_{f23}, p_{f31}, y_{f31}, p_{f32},$$
$$p_{f33}, p_{f41}, y_{f41}, p_{f42i}, p_{f43i})$$

$$v_i = \left( \frac{X_{pi}}{dt}, \frac{y_{pi}}{dt}, \ldots \right) \qquad (4)$$

Functional Configuration

As illustrated in FIG. 1, the attitude estimating device 10 includes an image input unit 11, an image retaining unit 12, a noncoincidence degree calculating unit 13, a movable range setting unit 14, a particle generating unit 15, a first updating unit 16, a second updating unit 17, and an output unit 18.

The image input unit 11 is a processing unit that inputs an image. The image input unit 11 is an example of an obtaining unit.

As one embodiment, the image input unit 11 may obtain a range image (x, y, d) by using a range image sensor, which is not illustrated, or, for example, an infrared (IR) camera, such that the IR camera measures a time taken for infrared irradiation light to return after being reflected by an object in an environment. As another example, the image input unit 11 may obtain a range image from an auxiliary storage device such as a hard disk or an optical disk that stores video or a removable medium such as a memory card or a universal serial bus (USB) memory. As yet another example, the image input unit 11 may obtain a range image by receiving the range image from an external device via a network. Thus, the paths through which the attitude estimating device 10 obtains a range image may be arbitrary paths such as a sensor, a network or a recording medium, and are not limited to particular paths. The image input unit 11 thereafter inputs the range image obtained through an arbitrary path to the image retaining unit 12, the noncoincidence degree calculating unit 13, and the second updating unit 17.

Incidentally, while a case is illustrated here in which the image retaining unit 12, the noncoincidence degree calculating unit 13, and the second updating unit 17 are supplied with a range image, the image retaining unit 12 and the noncoincidence degree calculating unit 13 do not necessarily have to be supplied with a range image. The image retaining unit 12 and the noncoincidence degree calculating unit 13 may be supplied with a gray-scale image, or may be supplied with a red, green, and blue (RGB) color image or the like.

The image retaining unit 12 is a storage unit that retains images.

As one embodiment, the image retaining unit 12 retains the range image input from the image input unit 11. For example, when the range image input from the image input unit 11 is an nth frame, the image retaining unit 12 may retain range images dating back for a given number of frames from the nth frame. In this case, range images of frames preceding the given number of frames may be automatically deleted from the image retaining unit 12. In addition to thus storing the range images, the image retaining unit 12 further retains partial images obtained by cutting out the region of an object as an attitude estimation target from the range images by the noncoincidence degree calculating unit 13 to be described later.

The noncoincidence degree calculating unit 13 is a processing unit that calculates a degree of noncoincidence between regions corresponding to the object as an attitude estimation target in a preceding image frame and a succeeding image frame. This noncoincidence calculating unit 13 is an example of a calculating unit.

As one embodiment, when the image input unit 11 inputs the range image of the nth frame to the noncoincidence degree calculating unit 13, the noncoincidence degree calculating unit 13 extracts a region corresponding to a hand from the range image of the nth frame. The region corresponding to the hand in the range image may hereinafter be described as a "hand region." When extracting such a hand region, the noncoincidence degree calculating unit 13, for example, cuts out the contours of candidates for the object by detecting, as an edge, pixels having distances whose differences therebetween are equal to or more than a given threshold value in the range image. Then, the noncoincidence degree calculating unit 13 extracts, as the hand region, an object candidate that includes an area not deviating from the size of the model of the hand as the attitude estimation target among the object candidates whose contours are cut out as described above.

Then, the noncoincidence degree calculating unit 13 calculates a degree of noncoincidence by comparing the hand region in the nth frame with the hand region in an (n−1)th frame retained by the image retaining unit 12. For example, the noncoincidence degree calculating unit 13 superimposes the hand region in the nth frame and the hand region in the (n−1)th frame on each other such that corresponding points such as centers of gravity or centers of the hand regions coincide with each other. Next, the noncoincidence degree calculating unit 13 counts pixels where the hand region in the nth frame and the hand region in the (n−1)th frame are not superposed on each other, and counts pixels where the hand region in the nth frame and the hand region in the (n−1)th frame are superposed on each other. This yields an area a of a part where the hand regions are superposed on each other between the nth frame and the (n−1)th frame and an area b of a part where the hand regions are not superposed on each other between the nth frame and the (n−1)th frame. Then, the noncoincidence degree calculating unit 13, as an example, calculates a degree of noncoincidence by a calculation of dividing the area b by a sum of the area a and the area b, for example, b/(a+b).

Figure 3:
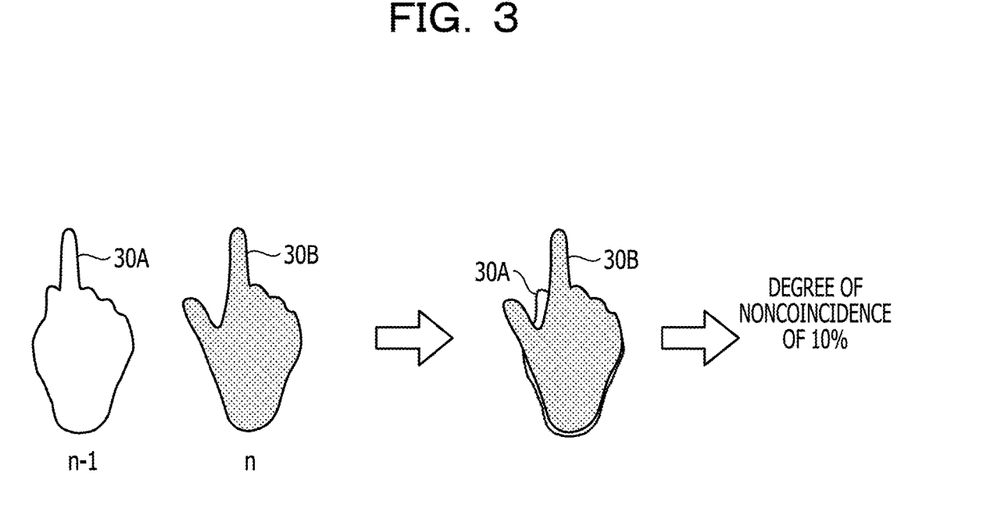
FIG. 3 is a diagram illustrating an example of setting a movable range.

FIG. 3 is a diagram illustrating an example of setting a movable range. In FIG. 3, a hand region 30A in the (n−1)th frame is illustrated in a non-hatched state, while a hand region 30B in the nth frame is illustrated in a hatched state. The hand region 30A in the (n−1)th frame and the hand region 30B in the nth frame are superimposed on each other with centers of gravity thereof or the like as corresponding points. Thereafter, pixels where the hand region 30A in the (n−1)th frame and the hand region 30B in the nth frame are not superposed on each other are counted, and pixels where the hand region 30A in the (n−1)th frame and the hand region 30B in the nth frame are superposed on each other are counted. Therefore, the following are calculated: the area of the part where the hand regions are not superposed on each other between the nth frame and the (n−1)th frame; and the area of the part where the hand regions are superposed on each other between the nth frame and the (n−1)th frame. A degree of noncoincidence of 10% is thereafter obtained by dividing the area of the part where the hand regions are not superposed on each other between the nth frame and the (n−1)th frame by a sum of the area of the part where the hand regions are superposed on each other between the nth frame and the (n−1)th frame and the area of the part where the hand regions are not superposed on each other between the nth frame and the (n−1)th frame.

Incidentally, while a case is illustrated here in which the degree of noncoincidence is calculated from the hand region in the nth frame and the hand region in the (n−1)th frame, the degree of noncoincidence may be calculated from the range image of the nth frame and the range image of the (n−1)th frame. In this case, as an example, it suffices to count pixels that are located at positions corresponding to each other between the nth frame and the (n−1)th frame and which include pixel values, for example, depth values d whose differences are not within a given range and pixels whose differences are within the given range, and calculate a ratio therebetween as the degree of noncoincidence.

The movable range setting unit 14 is a processing unit that sets a range in which a movable portion included in the model is estimated to be movable. The movable range setting unit 14 is an example of a setting unit. In the following, the range in which the movable portion is estimated to be movable will be described as a "movable range," whereas a maximum range in which the movable portion is movable may be described as "movable limits."

As one embodiment, each time the degree of noncoincidence is calculated by the noncoincidence degree calculating unit 13, the movable range setting unit 14 sets, for each joint, a movable range from the degree of noncoincidence and the movable limits of the joint. As an example, such a movable range is set for each of the joints including the parameters represented in boldface in FIG. 2. Further, for each of the joints including the parameters illustrated in boldface in FIG. 2, as an example, a measured value actually measured from the hand of a person as the attitude estimation target may be referenced as the movable limits of the joint, or a statistical value associated with an item under which the person as the attitude estimation target falls among statistical values associated with at least one of items such as a generation, males or females, and a race may be referenced as the movable limits of the joint.

Here, the movable range setting unit 14 sets a larger movable range as the degree of noncoincidence is increased, while setting a smaller movable range as the degree of noncoincidence is decreased. For example, the movable range setting unit 14 sets, as a movable range for each joint, a multiplication value obtained by multiplying the movable limits set for the each joint by the degree of noncoincidence calculated by the noncoincidence degree calculating unit 13. Suppose, for example, that the degree of noncoincidence is calculated to be 10% as illustrated in FIG. 3. In this case, when the movable range of a joint whose movable limits are 90° is calculated, 9° (±4.5°) is set as the movable range of the joint based on a calculation of 90°×10%. When such a movable range of the joint is used as the occurrence range of a random number determining an amount of change to be added to the angle of the joint which angle is estimated in the (n−1)th frame, the occurrence range of the random number may be narrowed down from the movable limits of the joint to the movable range of the joint.

The particle generating unit 15 is a processing unit that generates particles. The particle generating unit 15 is an example of a generating unit.

As one embodiment, each time the movable range setting unit 14 sets a movable range for each joint, the particle generating unit 15 makes a random number generated for each joint by using the movable range set for each joint as the occurrence range of the random number generated by the random number generating unit 15a. Then, the particle generating unit 15 generates a particle by adding, as an amount of change of each joint, the random number generated by the random number generating unit 15a for each joint to the angle of the each joint which angle is estimated in the (n−1)th frame. By repeating generation of such a particle, the particle generating unit 15 generates a given number of particles as attitude parameter information 15b. Here, the number of particles generated by the particle generating unit 15 may be set larger as the performance of a processor or the accuracy of estimation of an attitude requested to be output is increased, as an example. In addition, it is also possible to generate fewer particles as a desired period of attitude estimation is shortened. The attitude parameter information 15b thus generated is output to the first updating unit 16.

The first updating unit 16 is a processing unit that updates parameters related to each particle.

As one embodiment, the first updating unit 16 updates the change velocity and the attitude for each particle. For example, when the (k+1)th update related to the ith particle is performed, the first updating unit 16 calculates the change velocity v of the attitude of the ith particle in the (k+1)th update according to the above-described Equation (1). For example, the first updating unit 16 substitutes the change velocity v of the ith particle calculated at the time of the kth update into the first term of Equation (1). Further, the first updating unit 16 substitutes the optimum attitude xPbest, i in one particle, the attitude xPbest, i being updated by the second updating unit 17 at the time of the kth update, and the attitude x of the ith particle at the time of the kth update into the second term of Equation (1). Further, the first updating unit 16 substitutes the optimum attitude xGbest, i in all of the particles updated by the second updating unit 17 at the time of the kth update and the attitude x of the ith particle in the kth update into the third term of Equation (1). The change velocity v of the attitude of the ith particle in the (k+1)th update is thereby calculated.

Then, the first updating unit 16 calculates the attitude x of the ith particle in the (k+1)th update according to the above-described Equation (2). For example, the first updating unit 16 substitutes the attitude x of the ith particle in the kth update into the first term of Equation (2), and substitutes the change velocity v of the attitude of the ith particle in the (k+1)th update, the change velocity v being obtained by Equation (1), into the second term of Equation (2). Therefore, the attitude x of the ith particle in the (k+1)th update may be calculated.

The change velocity and the attitude of each particle may be updated by performing the calculation of Equation (1) and Equation (2) for all of the particles.

The second updating unit 17 is a processing unit that updates optimum values.

As one embodiment, after the first updating unit 16 updates the change velocities and the attitudes of the particles, the second updating unit 17 updates the optimum value xPbest, i of the attitude of each particle and the optimum value xGbest, i of the attitudes of all of the particles.

For example, the second updating unit 17 calculates an evaluation value of the ith particle calculated in the (k+1)th update from an error between the ith particle calculated in the (k+1)th update and the range image of the nth frame input as observation data from the image input unit 11. Then, the second updating unit 17 updates the attitude of a particle having a highest evaluation value among the attitudes x of ith particles calculated during a period of a zeroth update to the (k+1)th update as the optimum value xPbest, i of the attitude of the ith particle in the (k+1)th update. The attitude optimum value xPbest, i is updated for each particle by performing such an update for all of the particles. Further, the second updating unit 17 updates the attitude of a particle having a maximum evaluation value among the attitudes x of all of the particles calculated in the (k+1)th update as the optimum value xGbest, i of the attitudes of all of the particles in the (k+1)th update.

After thus updating the optimum value xPbest, i of the attitude of each particle and the optimum value xGbest, i of the attitudes of all of the particles, the second updating unit 17 determines whether or not an attitude estimation ending condition is satisfied. For example, the second updating unit 17 determines whether or not an evaluation value of the optimum value xGbest, i of the attitudes of all of the particles is equal to or more than a given threshold value. At this time, the second updating unit 17 ends the estimation of the attitude when the evaluation value of the optimum value xGbest, i of the attitudes of all of the particles is equal to or more than the threshold value. When the evaluation value of the optimum value xGbest, i of the attitudes of all of the particles is not equal to or more than the threshold value, on the other hand, the second updating unit 17 further determines whether or not the number of updates has reached a given upper limit number of times. Then, the second updating unit 17 ends the estimation of the attitude when the number of updates has reached the upper limit number of times. When the number of updates has not reached the upper limit number of times, on the other hand, the second updating unit 17 makes the first updating unit 16 update the change velocity and the attitude of each particle.

The output unit 18 is a processing unit that outputs an attitude estimation result.

As one embodiment, when the evaluation value of the optimum value xGbest, i of the attitudes of all of the particles is equal to or more than the threshold value, or when the number of updates has reached the upper limit number of times, the output unit 18 outputs the optimum value xGbest, i of the attitudes of all of the particles to a given output destination. An example of such an output destination is a gesture recognizing program recognizing a gesture such as movement of the hand or a sign. When this gesture recognition is used for a user interface (UI), detection of instruction operations of various kinds of electronic apparatuses including an information processing device may be realized. In addition, a display unit such as a display may be set as the output destination.

Incidentally, functional units such as the image input unit 11, the noncoincidence degree calculating unit 13, the movable range setting unit 14, the particle generating unit 15, the first updating unit 16, the second updating unit 17, and the output unit 18 illustrated in FIG. 1 may be implemented by a hardware processor such as a central processing unit (CPU), or a micro processing unit (MPU). While a CPU or an MPU is illustrated here as an example of a processor, the above-described functional units may be implemented by an arbitrary processor regardless of whether the processor is of a general-purpose type or a specialized type. In addition, the above-described functional units may be implemented by hard wired logic such as an application specific integrated circuit (ASIC), or a field programmable gate array (FPGA).

In addition, as an example, various kinds of semiconductor memory elements, for example, a random access memory (RAM) and a flash memory, or a part of storage areas thereof may be employed as the image retaining unit 12 illustrated in FIG. 1 and a work area used by the above-described functional units. In addition, a main storage device does not necessarily have to be used, but an auxiliary storage device such as a hard disk drive (HDD), an optical disk, or a solid state drive (SSD) may be employed.

Attitude Estimation Processing

Figure 4:
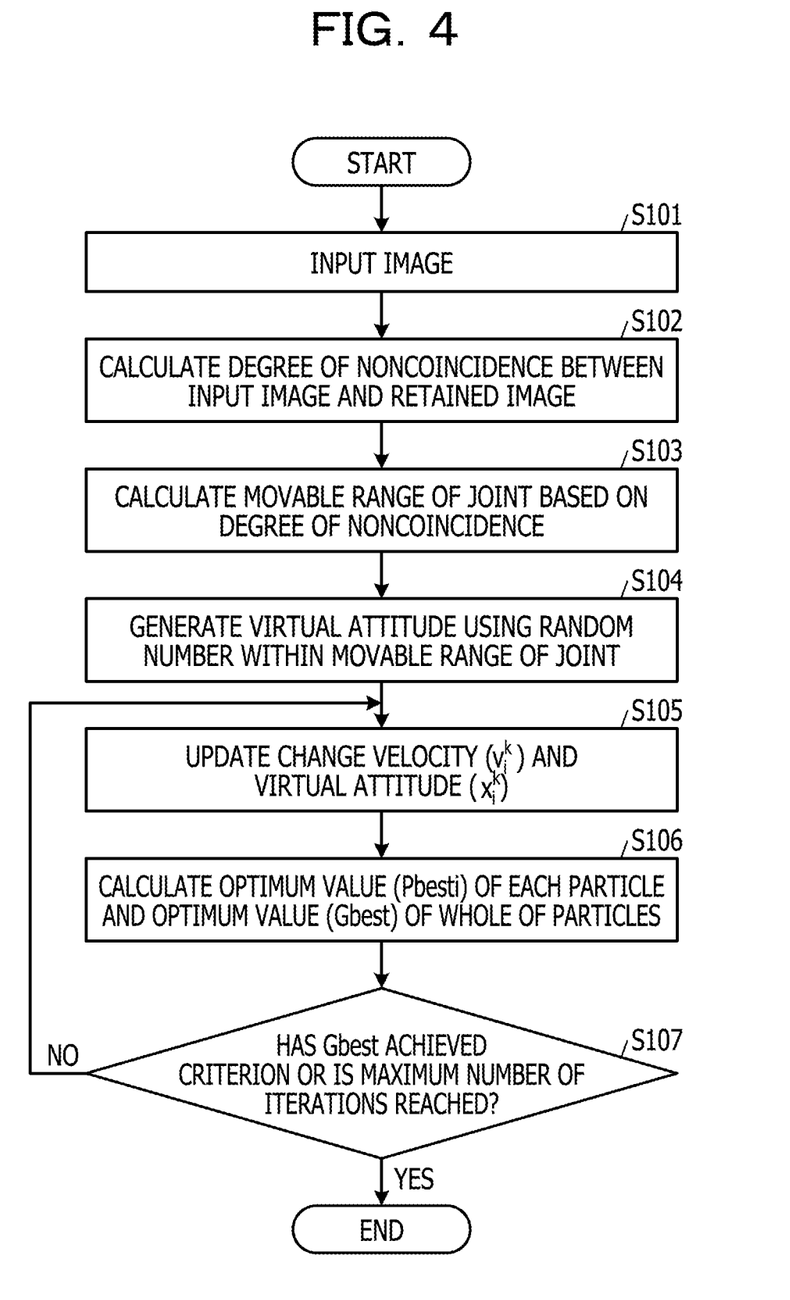
FIG. 4 is a flowchart illustrating a procedure of attitude estimation processing according to the first embodiment.

FIG. 4 is a flowchart illustrating a procedure of attitude estimation processing according to the first embodiment. This processing is repeatedly performed each time the image input unit 11 inputs a range image. As illustrated in FIG. 4, when the image input unit 11 inputs a range image (step S101), the noncoincidence degree calculating unit 13 calculates a degree of noncoincidence between a hand region extracted from the range image of an nth frame input in step S101 and a hand region extracted from the range image of an (n−1)th frame retained by the image retaining unit 12 (step S102).

Next, the movable range setting unit 14 sets a movable range for each joint from the degree of noncoincidence calculated for each joint in step S102 and the movable limits of the joint (step S103). Then, the particle generating unit 15 generates a given number of particles by repeating processing of adding, as an amount of change of each joint, a random number generated using the movable range set for the each joint in step S103 as the occurrence range of the random number generated by the random number generating unit 15a to the angle of the each joint which angle is estimated in the (n−1)th frame (step S104).

Then, the first updating unit 16 updates the change velocity vk of the attitude for each particle according to the above-described Equation (1), and updates the attitude xk for each particle according to the above-described Equation (2) (step S105). Then, the second updating unit 17 updates the optimum value xPbest, i of the attitude of each particle and the optimum value xGbest, i of the attitudes of all of the particles (step S106).

Then, the above-described processing of step S105 and step S106 is repeated until the evaluation value of the optimum value xGbest, i of the attitudes of all of the particles becomes equal to or more than the threshold value or the number of updates reaches the upper limit number of times (No in step S107).

The processing is thereafter ended when the evaluation value of the optimum value xGbest, i of the attitudes of all of the particles becomes equal to or more than the threshold value or the number of updates reaches the upper limit number of times (Yes in step S107).

One Aspect of Effects

As described above, the attitude estimating device 10 according to the present embodiment uses a movable range set for each joint from a degree of noncoincidence obtained from a difference between frames of input images and the movable limits of the joint as the generation range of a random number determining an amount of change of the each joint in PSO. The occurrence range of the random number may therefore be narrowed down from the movable limits of the joint to the movable range of the joint. Consequently, generation of a particle in an excessively larger range than an actual attitude change may be suppressed. Hence, the attitude estimating device 10 according to the present embodiment may appropriately set the occurrence range of the random number for generating a particle.

For example, when the degree of noncoincidence is calculated to be 0.5, the movable range of each joint is narrowed down to 0.5 times the movable limits of the joint. At this time, when the number of joints is 10, the range of an amount of attitude change possible with k=0 as an initial value is $0.5^{10}$ ($\approx 1/1000$) times that in a case where the occurrence range of the random number is the movable limits of the joint. In PSO, a speed at which an update result converges is determined by parameters such as "w" and "c" in Equation (1), and the number of updates taken for the particle to converge to $0.5^{10}$ ($\approx 1/1000$) times the range may be reduced by approximately 10. Further, when the particle converges in approximately 40 updates, a processing reduction of 25%, or, for example, shortening of a processing time by 25% may be achieved.

Figure 5:
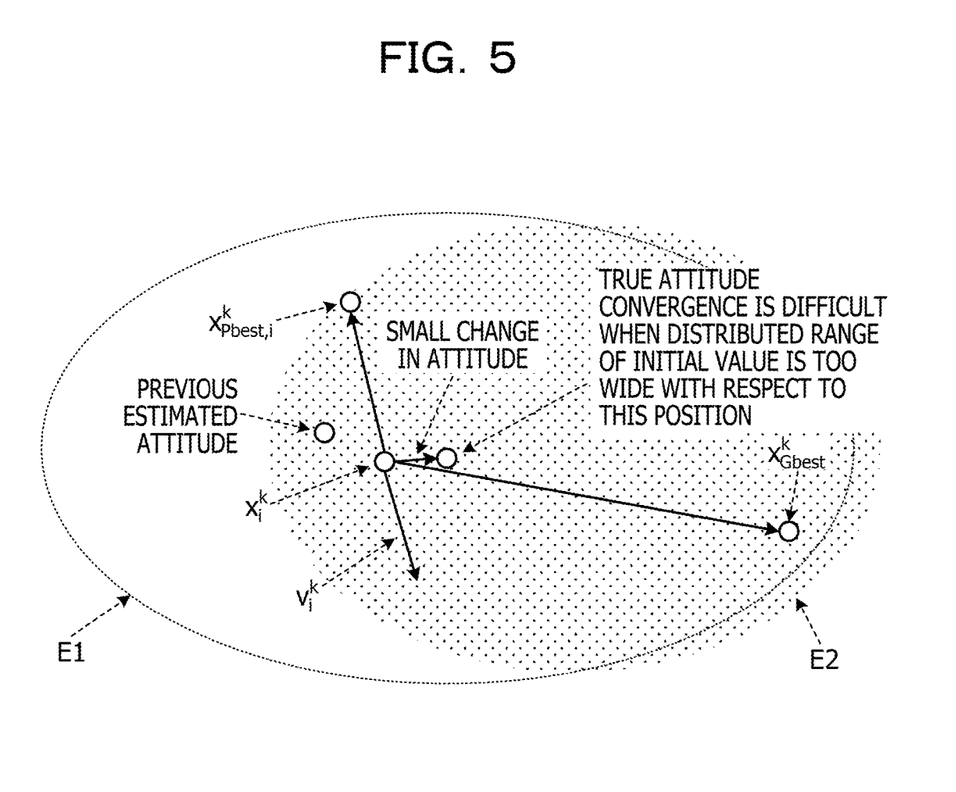
FIG. 5 is a diagram illustrating an example of occurrence ranges of random numbers.

FIG. 5 is a diagram illustrating an example of occurrence ranges of random numbers. FIG. 5 illustrates an occurrence range E1 of a random number corresponding to the movable limits of a joint and an occurrence range E2 of a random number corresponding to the movable range of the joint, the movable range being set according to a degree of noncoincidence. Of the random number occurrence ranges, the random number occurrence range E1 is indicated by a broken line, while the random number occurrence range E2 is indicated by hatching. As illustrated in FIG. 5, the random number occurrence range E1 is too wide as a random number occurrence range as compared with an attitude change from a previous attitude estimation result to an actual attitude. In this case, it is difficult for a particle update result to converge to the actual attitude, and the number of updates before the particle update result converges to the actual attitude is increased. On the other hand, the random number occurrence range E2 is narrowed down to a narrower range than the random number occurrence range E1. It is therefore clear that the particle update result may readily converge to the actual attitude, and that the number of updates before the particle update result converges to the actual attitude may be reduced.

Figure 6:
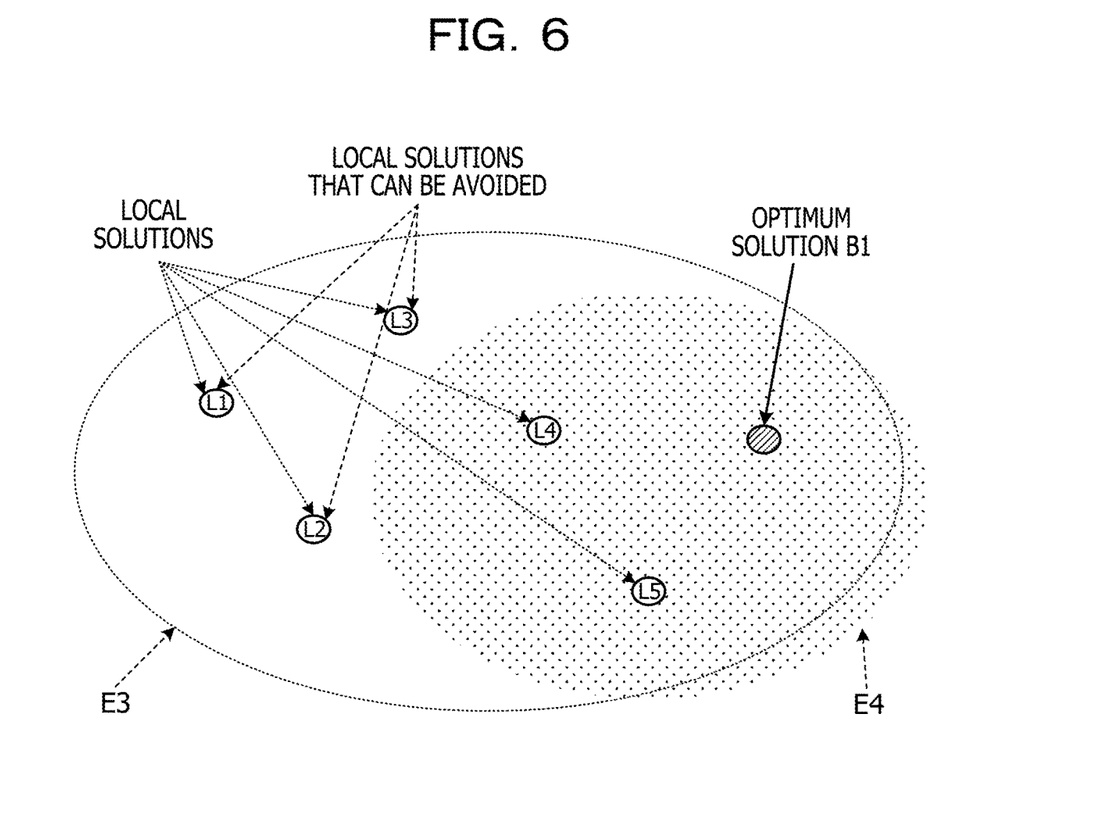
FIG. 6 is a diagram illustrating an example of occurrence ranges of random numbers.

FIG. 6 is a diagram illustrating an example of occurrence ranges of random numbers. FIG. 6 also illustrates an occurrence range E3 of a random number corresponding to the movable limits of a joint and an occurrence range E4 of a random number corresponding to the movable range of the joint, the movable range being set according to a degree of noncoincidence. Of the random number occurrence ranges, the random number occurrence range E3 is indicated by a broken line, while the random number occurrence range E4 is indicated by hatching. Further, FIG. 6 illustrates an optimum solution B1 corresponding to an actual attitude and five locally dominant local solutions L1 to L5 other than the optimum solution. As one aspect, such local solutions occur due in part to high dimensionality of an evaluation function for calculating the attitude evaluation value used to determine the propriety of update of the attitude optimum values or iteration, for example.

As illustrated in FIG. 6, the random number occurrence range E3 is too wide as a random number occurrence range as compared with an attitude change from a previous attitude estimation result to an actual attitude. Such a random number occurrence range E3 includes the five local solutions L1 to L5 in addition to the optimum solution B1. On the other hand, the random number occurrence range E4 is narrowed down to a narrower range than the random number occurrence range E3. Such a random number occurrence range E4 includes two local solutions L4 and L5 in addition to the optimum solution B1. The three local solutions L1 to L3 may be avoided by thus narrowing down the random number occurrence range E4. Therefore, a possibility of falling into a local solution during repetition of the update of the particle may be reduced. As a result, the accuracy of estimation of the attitude may be improved.

Second Embodiment

An embodiment of a device according to the disclosure has been described thus far. However, the present technology may be carried out in various different forms other than the foregoing embodiment. Accordingly, other embodiments included in the present technology will be described in the following.

Calculation of Degree of Coincidence

The foregoing first embodiment illustrates a case where a degree of noncoincidence is used to set a movable range. However, a degree of coincidence may be used. For example, a degree of coincidence may be calculated by dividing the area a of the part where the hand regions are superposed on each other between the nth frame and the (n−1)th frame by the sum of the area a of the part where the hand regions are superposed on each other between the nth frame and the (n−1)th frame and the area b of the part where the hand regions are not superposed on each other between the nth frame and the (n−1)th frame. In this case, a result substantially equal to that in the case where a degree of noncoincidence is multiplied by the movable limits of a joint may be obtained by multiplying a subtraction value obtained by subtracting the degree of coincidence from 1 (=100%) by the movable limits of the joint.

Example of Application of Setting of Movable Range

The foregoing first embodiment illustrates a case where a movable range is set by multiplying a degree of noncoincidence by the movable limits of a joint. However, for example, a lower limit value of the movable range of the joint may be set at 30 percent of the movable limits of the joint, an upper limit value of the movable range of the joint may be set at 70 percent of the movable limits of the joint, and an interval determined by the upper limit value and the lower limit value may be calculated linearly or nonlinearly according to the value of the degree of noncoincidence.

Example of Application of Calculation of Degree of Noncoincidence

The above-described attitude estimating device 10 may also calculate, as a degree of noncoincidence, a statistical value, for example, an average value of distances between the range image of the nth frame and the range image of the (n−1)th frame. Hand regions are extracted from the respective range images of the nth frame and the (n−1)th frame as in the foregoing first embodiment.

Figure 7:
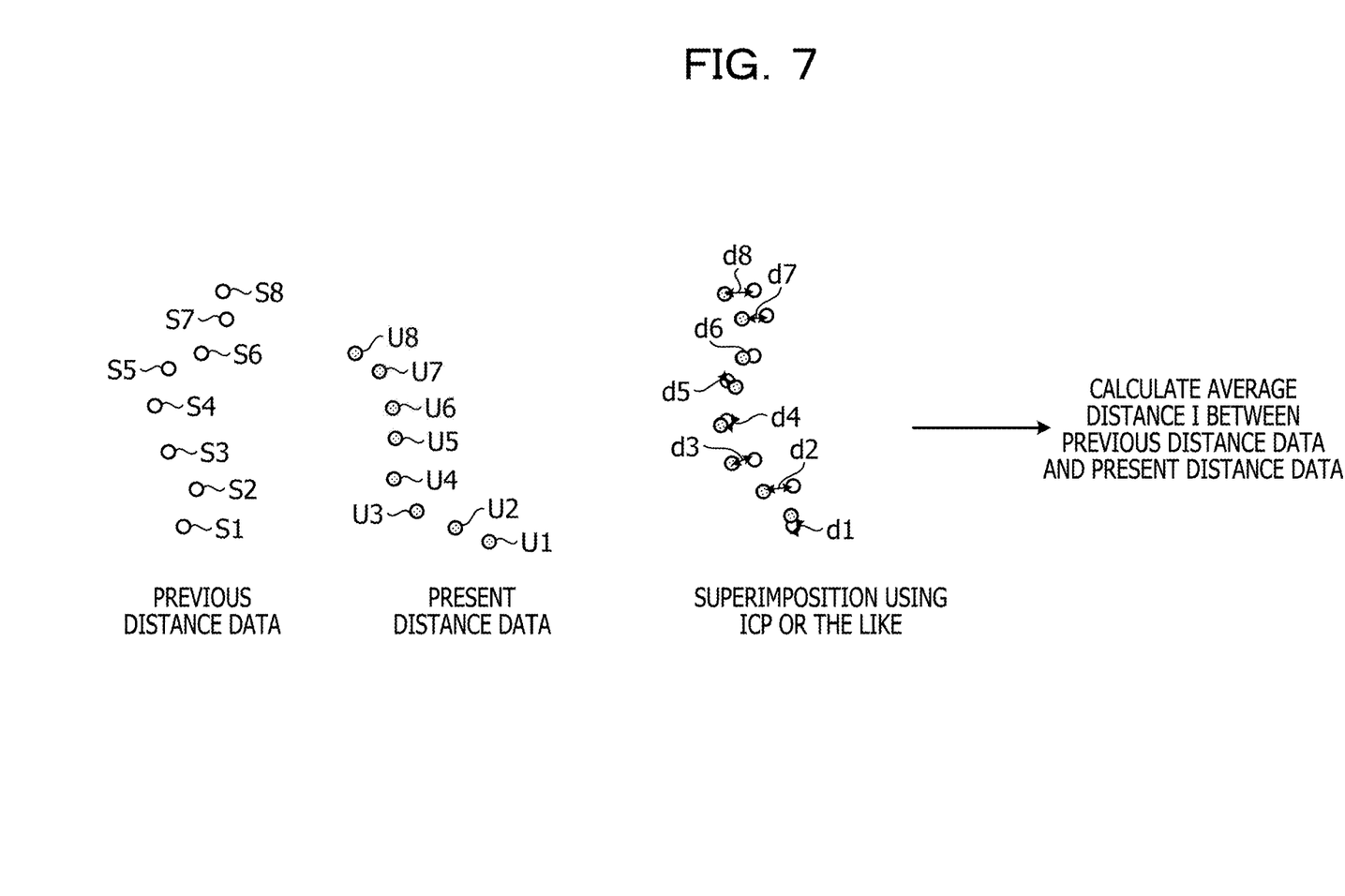
FIG. 7 is a diagram illustrating an example of application of calculation of a degree of noncoincidence.

FIG. 7 is a diagram illustrating an example of application of calculation of a degree of noncoincidence. FIG. 7 illustrates a point group S1 to S8 included in the hand region in the (n−1)th frame and a point group U1 to U8 included in the hand region in the nth frame. While eight points are extracted and illustrated as a point group included in a hand region in this case, FIG. 7 is a mere schematic diagram, and point groups are not limited to this numerical value. The point group S1 to S8 and the point group U1 to U8 are superimposed on each other according to an iterative closest point (ICP) algorithm. For example, for each point included in the hand region in the nth frame, the points included in the hand region in the (n−1)th frame are searched for the point included in the hand region in the nth frame. For example, point U1 is retrieved for point S1, point U2 is retrieved for point S2, point U3 is retrieved for point S3, point U4 is retrieved for point S4, point U5 is retrieved for point S5, point U6 is retrieved for point S6, point U7 is retrieved for point S7, and point U8 is retrieved for point S8. Thereafter, for each point included in the hand region in the nth frame, a distance is calculated between the point in question and the point on the hand region in the (n−1)th frame which point corresponds to the point in question. In the example of FIG. 7, the following are calculated: a distance between point S1 and point U1, a distance between point S2 and point U2, a distance between point S3 and point U3, a distance between point S4 and point U4, a distance between point S5 and point U5, a distance between point S6 and point U6, a distance between point S7 and point U7, and a distance between point S8 and point U8. An average value of these eight distances is calculated as an average distance I. This average distance I is divided by a given threshold value, for example, a minimum moving distance at which there is completely no overlap between the hand regions. A maximum value is thereby set at 1, or in other words 100%. The average distance I may be used as a degree of noncoincidence by thus normalizing the average distance I.

Distribution and Integration

In addition, the constituent elements of each device illustrated in the figures do not necessarily need to be physically configured as illustrated in the figures. For example, concrete forms of distribution and integration of each device are not limited to those illustrated in the figures, but the whole or a part of each device may be configured so as to be distributed and integrated functionally or physically in arbitrary units according to various kinds of loads, usage conditions, or the like. For example, the image input unit 11, the noncoincidence degree calculating unit 13, the movable range setting unit 14, the particle generating unit 15, the first updating unit 16, the second updating unit 17, or the output unit 18 may be coupled as a device external to the attitude estimating device 10 via a network. In addition, the image input unit 11, the noncoincidence degree calculating unit 13, the movable range setting unit 14, the particle generating unit 15, the first updating unit 16, the second updating unit 17, and the output unit 18 may be possessed by respective separate devices, may be coupled to each other by a network, and may cooperate with each other to thereby implement the functions of the attitude estimating device 10 described above. In addition, separate devices may each include the whole or a part of the information stored in the image retaining unit 12, may be coupled to each other by a network, and may cooperate with each other to thereby implement the functions of the attitude estimating device 10 described above.

Attitude Estimating Program

In addition, the various kinds of processing described in the foregoing embodiments may be implemented by executing a program prepared in advance in a computer such as a personal computer or a workstation. Accordingly, referring to FIG. 8, the following description will be made of an example of a computer that executes an attitude estimating program including functions similar to those of the foregoing embodiments.

Figure 8:
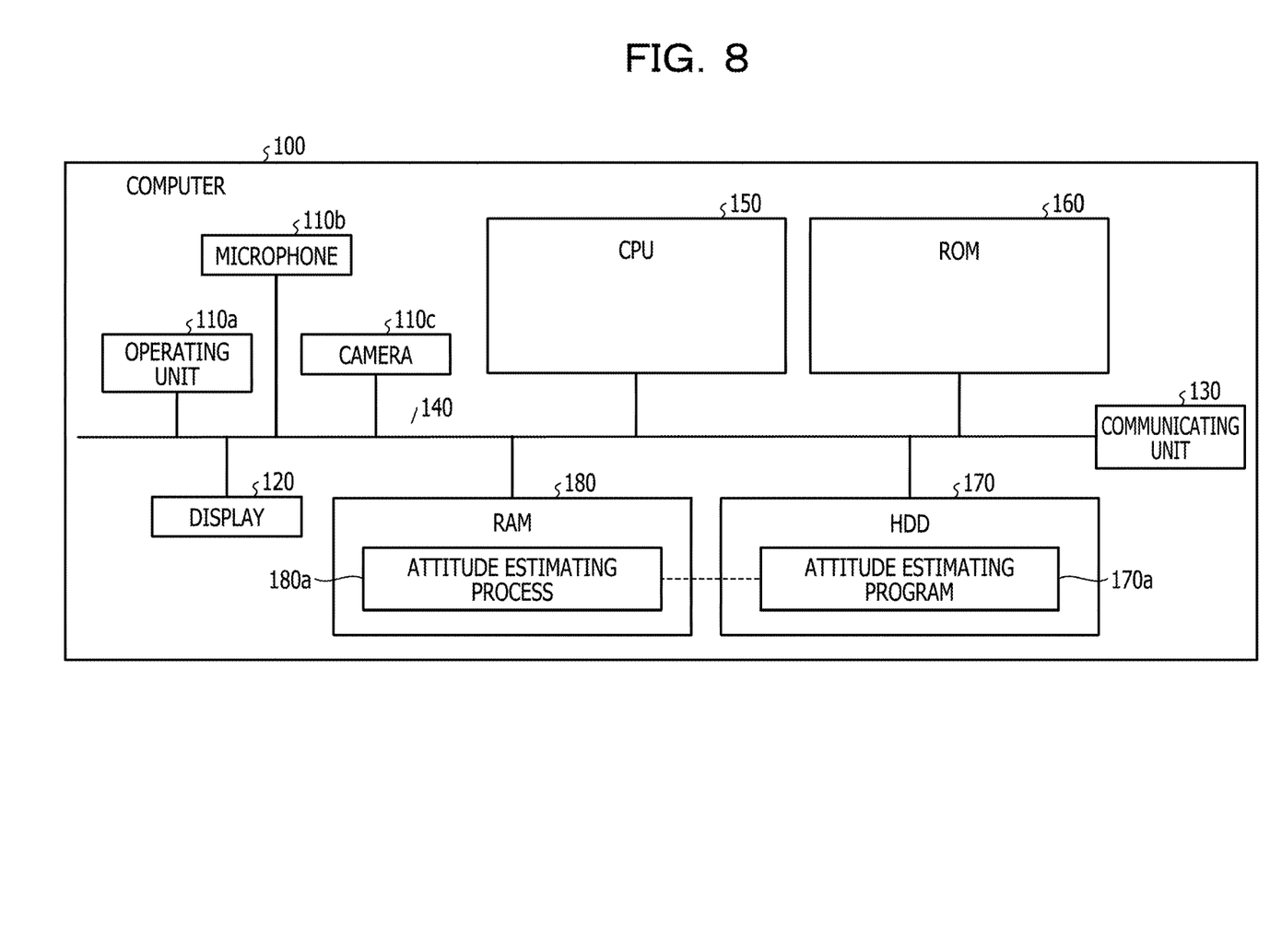
FIG. 8 is a diagram illustrating an example of a hardware configuration of a computer that executes an attitude estimating program according to the first embodiment and a second embodiment.

FIG. 8 is a diagram illustrating an example of a hardware configuration of a computer that executes an attitude estimating program according to the first embodiment and a second embodiment. As illustrated in FIG. 8, a computer 100 includes an operating unit 110*a*, a speaker 110*b*, a camera 110*c*, a display 120, and a communicating unit 130. The computer 100 further includes a CPU 150, a read only memory (ROM) 160, an HDD 170, and a RAM 180. These units 110 to 180 are coupled to each other via a bus 140.

As illustrated in FIG. 8, the HDD 170 stores an attitude estimating program 170*a* that exerts functions similar to those of the image input unit 11, the noncoincidence degree calculating unit 13, the movable range setting unit 14, the particle generating unit 15, the first updating unit 16, the second updating unit 17, and the output unit 18 illustrated in the foregoing first embodiment. As with the constituent elements of the image input unit 11, the noncoincidence degree calculating unit 13, the movable range setting unit 14, the particle generating unit 15, the first updating unit 16, the second updating unit 17, and the output unit 18 illustrated in FIG. 1, the attitude estimating program 170*a* may be integrated or separated from each other. For example, the HDD 170 does not necessarily need to store all of the data illustrated in the foregoing first embodiment, but it suffices for the HDD 170 to store data used for processing. It is possible to modularize functions exerted by the image input unit 11, the noncoincidence degree calculating unit 13, and the movable range setting unit 14 among the above-described functional units, for example, functions up to the setting of a movable range.

Under such an environment, the CPU 150 reads the attitude estimating program 170*a* from the HDD 170, and then expands the attitude estimating program 170*a* in the RAM 180. As a result, as illustrated in FIG. 8, the attitude estimating program 170*a* functions as an attitude estimating process 180*a*. The attitude estimating process 180*a* expands various kinds of data read from the HDD 170 in an area assigned to the attitude estimating process 180*a* in a storage area of the RAM 180, and performs various kinds of processing using the expanded various kinds of data. For example, the processing illustrated in FIG. 4 is included as an example of the processing performed by the attitude estimating process 180*a*. Incidentally, in the CPU 150, not all of the processing units illustrated in the foregoing first embodiment necessarily need to operate, but it suffices to virtually implement processing units corresponding to processing to be performed.

Incidentally, the above-described attitude estimating program 170*a* does not necessarily need to be stored in the HDD 170 or the ROM 160 from the beginning. The attitude estimating program 170*a* is stored on a "portable physical medium" such as a flexible disk, or a so-called FD, a compact disc (CD)-ROM, a digital versatile disk (DVD), a magneto-optical disk, or an integrated circuit (IC) card inserted into the computer 100. The computer 100 may then obtain the attitude estimating program 170*a* from these portable physical media, and execute the attitude estimating program 170*a*. In addition, the attitude estimating program 170*a* may be stored in advance in another computer, a server device, or the like coupled to the computer 100 via a public line, the Internet, a local area network (LAN), a wide area network (WAN), or the like, and the computer 100 may obtain the attitude estimating program 170*a* from the other computer, the server device, or the like and execute the attitude estimating program 170*a*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A method performed by a computer for attitude estimation, the method comprising:
   executing, by a processor of the computer, a first process that includes obtaining a first image;
   executing, by the processor of the computer, a second process that includes calculating a degree of noncoincidence between the obtained first image and a second image obtained before the first image;
   executing, by the processor of the computer, a third process that includes setting a first range for each movable portion of a model as an attitude estimation target in accordance with the degree of noncoincidence, the first range being a range in which the movable portion is estimated to be movable in a frame from which the first image is obtained; and
   executing, by the processor of the computer, a fourth process that includes outputting the first range set for each movable portion as a generation range of a random number determining an amount of change of the each movable portion of the model to a generating process configured to generate a particle as a candidate for an attitude of the model in accordance with the generation range.

2. The method according to claim 1, wherein the second process includes superimposing a first region corresponding to the model within the first image and a second region corresponding to the model within the second image on each other using corresponding points of the first image and the second image, and calculating the degree of noncoincidence from a first area in which the first region and the second region are superposed on each other and a second area in which the first region and the second region are not superposed on each other.

3. The method according to claim 2, wherein the second process includes calculating a ratio of the first area to the second area as the degree of noncoincidence.

4. The method according to claim 1, wherein the first process includes obtaining a range image, wherein the first image is a first range image and the second image is a second range image, and wherein the second process includes calculating a statistical value of distances between the first range image and the second range image as the degree of noncoincidence.

5. An apparatus for attitude estimation, the apparatus comprising:

a memory; and a processor coupled to the memory and configured to execute a first process that includes obtaining a first image;

execute a second process that includes calculating a degree of noncoincidence between the obtained first image and a second image obtained before the first image;

execute a third process that includes setting a first range for each movable portion of a model as an attitude estimation target in accordance with the degree of noncoincidence, the first range being a range in which the movable portion is estimated to be movable in a frame from which the first image is obtained; and execute a fourth process that includes outputting the first range set for each movable portion as a generation range of a random number determining an amount of change of the each movable portion of the model to a generating process configured to generate a particle as a candidate for an attitude of the model in accordance with the generation range.

6. A non-transitory computer-readable storage medium for storing a program that causes a first computer to execute a process for attitude estimation, the process comprising:

executing a first process that includes obtaining a first image;

executing a second process that includes calculating a degree of noncoincidence between the obtained first image and a second image obtained before the first image;

executing a third process that includes setting a first range for each movable portion of a model as an attitude estimation target in accordance with the degree of noncoincidence, the first range being a range in which the movable portion is estimated to be movable in a frame from which the first image is obtained; and executing a fourth process that includes outputting the first range set for each movable portion as a generation range of a random number determining an amount of change of the each movable portion of the model to a generating process configured to generate a particle as a candidate for an attitude of the model in accordance with the generation range.

* * * * *